United States Patent [19]

Chang et al.

[11] Patent Number: 5,027,110
[45] Date of Patent: Jun. 25, 1991

[54] ARRANGEMENT FOR SIMULTANEOUSLY DISPLAYING ON ONE OR MORE DISPLAY TERMINALS A SERIES OF IMAGES

[75] Inventors: Christina L. Chang, Belford, N.J.; Jesus M. Gaeta, Chagrin Falls, Ohio; Kathleen G. O'Malley, Woodbridge; Stuart W. Rowland, Red Bank, both of N.J.

[73] Assignee: AT&T Bell Laboratories, Murray Hill, N.J.

[21] Appl. No.: 279,696

[22] Filed: Dec. 5, 1988

[51] Int. Cl.⁵ ............................................. G09G 5/00
[52] U.S. Cl. .................................. 340/731; 340/717; 340/721
[58] Field of Search ................. 340/731, 721, 723, 717

[56] References Cited

U.S. PATENT DOCUMENTS

| | | | |
|---|---|---|---|
| 4,107,665 | 8/1978 | Mayer et al. | 340/731 |
| 4,257,044 | 3/1981 | Fukuoka | 340/731 |
| 4,366,475 | 12/1982 | Kishi et al. | 340/731 |
| 4,516,074 | 5/1985 | Sugimoto | 324/309 |
| 4,649,380 | 3/1987 | Penna | 340/731 |
| 4,729,127 | 3/1988 | Chan et al. | 382/56 |
| 4,751,507 | 6/1988 | Hama et al. | 340/731 |

OTHER PUBLICATIONS

Technicare 2060/2020 HP System Software Procedures, Manual 961099, Rev. A., Oct. 1983, Sec. 9 and 10.
Scanning Electron Microscopy/1972 (Part I), Apr. 1972, "Simultaneous Display System of Different Magnification Images. . . " T. Nagatani et al., pp. 49–56, Apr. 1972.
1988 AAPM Aurtopical Symposium, Apr. 22–23, 1988, La., "Digital Radiography & Pacs", Siemens, Iselin, N.J., J. Strauss & Co. Spilker, Product Mgrs, Apr. 22–23, 1988.
"Integrated Diagnostics (ID): A Critical Need", A Progress Report from General Electric, Copyright 1984 General Electric Co., G. E. Company, Medical Systems Group, Milwaukee, Wis.

*Primary Examiner*—Jeffery A. Brier
*Attorney, Agent, or Firm*—Frederick B. Luludis

[57] ABSTRACT

A picture archiving and communication system having a number of display units associated therewith is provided with an image display arrangement for simultaneously displaying all of the images of a series of related images. Typically, the number and resolution of the images in a series exceeds the capacity of the display units. Consequently, only a small number of the images may be simultaneously displayed on the display units. To deal with this, the display arrangement of the present invention spatially reduces each image of the series so that all them may be simultaneously displayed on the display units. Thereafter, if the user desires to display one or more of the images in full spatial resolution, then all that the user needs to do is mark those images in a predetermined manner and enter a particular request.

8 Claims, 12 Drawing Sheets

ARRANGEMENT FOR SIMULTANEOUSLY DISPLAYING ON ONE OR MORE DISPLAY TERMINALS A SERIES OF IMAGES

TECHNICAL FIELD

The invention relates to picture archiving and communication systems, and more particularly relates to an arrangement for displaying all images of a series of related images across a minimum number of display units.

BACKGROUND OF THE INVENTION

In a radiology system, a series of related images are typically obtained using a scanning device, such as a Computed Tomography scanner (CT) or Magnetic Resonance Imaging (MRI) scanner. A hard copy (film) of each image of the series is then manually placed on a light box commonly referred to as an alternator. (In many instances a series may contain 80 images.) A radiologist then quickly studies the images selecting individual ones thereof for further study. The film bearing the selected images are then manually grouped together on the alternator.

Some of the manual aspects of studying images have been automated to increase a radiologist's efficiency. For example, so-called medical picture archiving and communication (PAC) systems (also referred to as Teleradiology systems) have been developed to electronically "grab" each image of a series of images scanned by a CT or MRI scanner and store a digital copy thereof in memory. Thereafter, a radiologist positioned at a workstation may cause ones, but not all, of the stored series of images to be displayed on respective display units. The radiologist may thereafter cause the remaining images of the series to be displayed in place of those already displayed on the display units.

To date, a number of the radiologists who use a PAC system in place of the manual alternator arrangement indicate that their efficiency has actually decreased. The reason for this is that PAC systems do not have the capability to display all of the images of a series across a small number of display units. In addition, such PAC systems do not allow a radiologist to select individual ones of the displayed images and have them redisplayed as a group of images, as is done in the instance where a radiologist uses an alternator.

SUMMARY OF THE INVENTION

To closely emulate the way in which a radiologist uses an alternator, reduced (minified) versions of a series of up to 80 images may be displayed across a small number of display units, for example, four display units. Thereafter, the radiologist may cause one or more of the images to be displayed in full spatial resolution by marking each such image in a predetermined manner. In response thereto, the arrangement displays the marked images as a group of images each displayed in full spatial resolution. Alternatively, a radiologist may cause one image and a predetermined number of succeeding images of the series of images to be displayed in full resolution by selecting the one image and entering a predetermined request.

DETAILED DESCRIPTION

Figure 1:
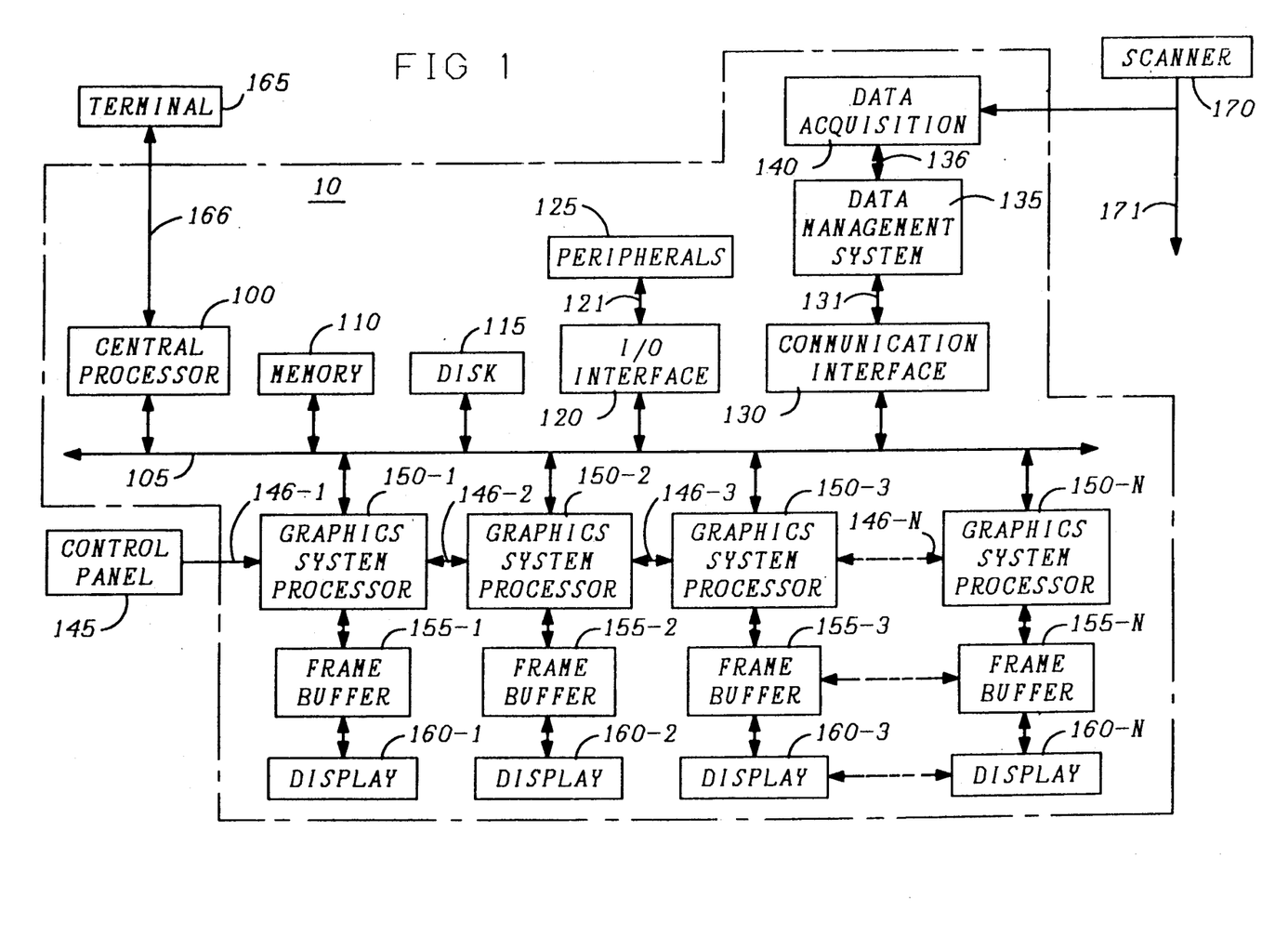
FIG. 1 shows a simplified block diagram of a picture archiving and communication system embodying the principles of the invention.

Turning now to FIG. 1 there is shown a simplified block diagram of a so-called picture archiving and communication system 10. At the heart of system 10 is central processor 100 which provides, inter alia, system control, host processing and memory management. System control features include, for example, system clock generation, interrupt handling and bus arbitration. Central processor 100 communicates with its peripheral circuits via bus 105. These peripherals include memory 110, hard disk 115, data management system (DMS) 135, and graphic system processors 150-1 through 150-N. Central processor 100 also communicates with other peripherals collectively designated 125 via bus 105 and I/O interface circuit 120. These other peripherals include, for example, a data entry terminal, maintenance port and printers. The design of bus 105 follows the well-known VME bus standard and includes a so-called bus buffer (not shown). Information, such as so-called picture elements (pixels) indicative of an image, presented on bus 105 are temporarily stored in the bus buffer before they are passed to one of the graphic system processors 150-1 through 150-N.

Graphic system processors 150-1 through 150-N each include a display processor and memory (not shown), such as so-called DRAM memory, for the storage of images. An image stored in the memory of a graphic system processor is ultimately supplied to its respective frame buffer. An image stored in a frame buffer is then displayed on the display unit associated therewith.

DMS 135 comprises a host processor and at least one large capacity disk (not shown), the disk being, for example, a hard disk. DMS 135 communicates with data acquisition device 140 via bus 136 to obtain a digital version of an image outputted by scanner 170. Specifically, scanner 170, which may be, for example, either a computed tomography (CT) scanner or magnetic resonance imaging (MRI) scanner, outputs to bus 171 analog (video) signals indicative of an image that it is scanning, the image being, for example, a particular-cross section of a patient's anatomy. During a radiology scanning session, scanner 170 may be set to scan a series of such images comprising contiguous cross-sections commonly referred to as slices. Data acquisition circuit 140, which is commonly referred to as a frame grabber, (a) "grabs" each scan line of an image that scanner 170 outputs to bus 171, (b) converts the analog signals to digital picture elements (pixels), and (c) passes the latter to DMS 135 via bus 136. DMS 135, in turn, stores the pixels in the aforementioned hard disk.

Thereafter, a user, such as a radiologist, may request system 10 to display the series of images across display units 160-1 through 160-N. The user does this by entering via terminal 165 either the patient's name or associated identification number. Central processor 100 responsive to receipt thereof via bus 166 sends to DMS 135 via bus 105 and communication interface circuit 130 a command containing either the patient's name or number. DMS 135, in turn, unloads from its hard disk a record associated with the patient and downloads the record to bus 105 via communication interface circuit 130.

Central processor 100 removes the record from bus 105, stores it in memory 110 and displays the record on terminal 165. Central processor 100 then awaits for the user to enter a request to view the series of images identified in the patient's record. (It is noted that a patient's record may identify one or more series of such images.) Responsive to receipt of such a request, central processor 100 sends to DMS 135 via bus 105 and communication interface circuit 130 a command containing the identity of the first image in the series selected by the user. DMS 135, in turn, unloads from its hard disk the pixels indicative of the image identified in the command and downloads them to bus 105 via communication interface 130. As noted above, the image is temporarily stored in the buffer associated with bus 105. Central processor 100 then sends to one of its graphic system processors, e.g., graphic system processor 150-1, a command requesting the DRAM memory location at which the image is to be stored. Responsive to receipt of the location, central processor 100 causes the image stored in the bus 105 bus buffer to be stored in the DRAM memory associated with graphic system processor 150-1 starting at the priorly identified location.

When the image is thus stored, graphic system processor 150-1 transfers a copy thereof to frame buffer 155-1 for display on display unit 160-1. This interaction between central processor 100, DMS 135 and graphic system processor 150-1 is repeated until a first group of the series of images has been stored in the DRAM memory associated with graphic system processor 150-1 and displayed on display unit 160-1. Thereafter, central processor 100 similarly interacts with the remaining graphic system processors 150-2 through 150-N, respectively, to display the remaining groups of the series of images on display units 160-2 through 160-N.

As mentioned above, scanner 170 outputs analog signals indicative of an image that it is scanning. The full spatial resolution (size) of such an image may be, for example, 512 pixels by 512 pixels. In an illustrative embodiment of the invention, each of the display units 160-1 through 160-N is a high resolution bit-mapped graphics display unit, such as, for example, the Model L7804PY30C display monitor available from DisplayTek Inc. of Elgin, Ill., which has a display resolution of 1024 rows of 1280 columns of pixels each row. Irrespective of such resolution, only a group of four such images may be concurrently displayed on the display unit in full spatial resolution. Thus, 20 display units (N=20) would be needed to concurrently display a series of 80 related images of 512 by 512 pixels each image to emulate the way it is done using an alternator. The provision of 20 displays units is not only expensive, but also consumes an inordinate amount of space.

To deal with this problem, prior arrangements display a limited number of images, such as, for example, four groups of four images each group across a like number of respective display units. After viewing the displayed images, the radiologist may then display the next four groups of images, and so on.

Our approach to dealing with this problem is different. In our arrangement, in accordance with the invention, the images are initially displayed in reduced spatial resolution so that twenty images may be concurrently displayed on a display unit, with each image being displayed as 256 pixels by 256 pixels when the original image has a full spatial resolution of 512 pixels by 512 pixels. Since each such image is essentially one-fourth of the size of its original image, we are able to display 20 spatially reduced images on a display unit. Thus, 80 such images may be displayed on just four display units, thereby effectively emulating the way it is done using an alternator. In addition, the user may, in accordance with an aspect of the invention, mark individual ones of the displayed images and have them redisplayed in full resolution, as will be discussed below.

Figure 2:
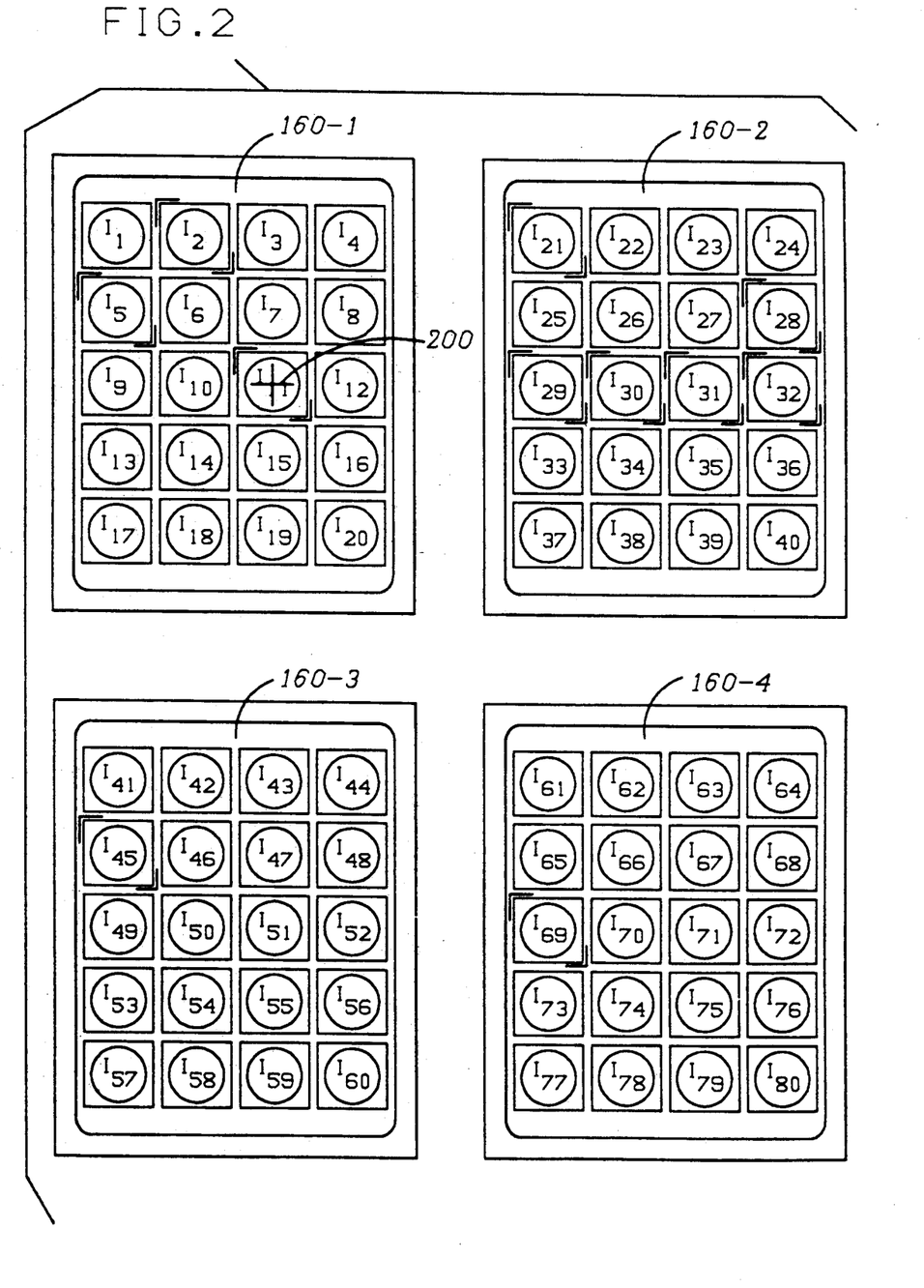
FIG. 2 illustrates the manner in which a series of images are displayed in accordance with the principles of the invention.
Figure 3:
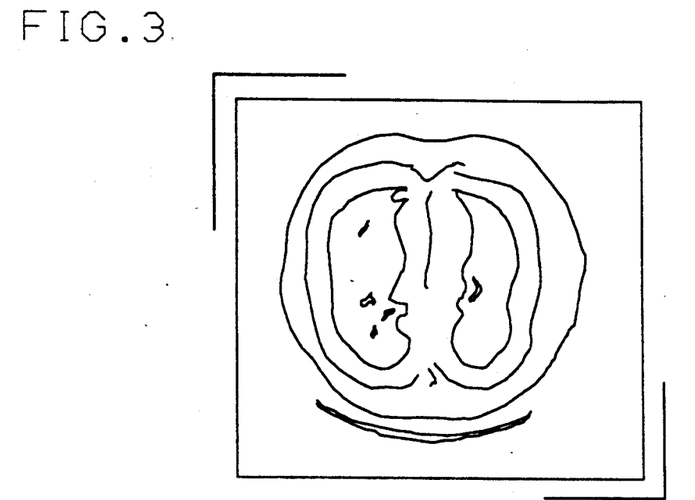
FIG. 3 is a rendition of one of the images depicted in FIG. 2.

Turning now to FIG. 2, there is shown four display units 160-1 through 160-4 each displaying 20 images in reduced spatial resolution. It is understood of course, that in contemplation of the invention, either the number or resolution of the display units may be readily increased to accommodate a series of up to, for example, 100 images, if so desired. For drawing simplicity, each of the images 11 through 180 are shown as circles representative of respective medical images. In addition, it is assumed that each image occupies a display area measuring more or less 256 pixels by 256 pixels. For completeness, a rendition of a typical medical image displayed in reduced spatial resolution, i.e., 256 pixels by 256 pixels, is shown FIG. 3.

As mentioned above, the graphic system processors are arranged to supply to their respective frame buffers a copy of each image that is stored in their respective DRAM memories. However, such copies are, in accordance with the invention, spatially reduced before they are supplied to the frame buffers. A spatially reduced copy of an image is formed by, in accordance with an aspect of the invention, storing in a DRAM memory every other row of pixels—illustrative the odd numbered rows of pixels—and every other column of pixels—illustratively the odd numbered columns of pixels—of an image that central processor 100 has transferred from the bus 105 bus buffer to a DRAM memory. Thus, each graphic system processor is arranged to create a spatially reduced version of an image stored in its DRAM memory. For example, graphic system processor 150-1 creates a spatially reduced copy of an image after it has been stored in its DRAM memory by moving a copy of the odd numbered rows and columns of the original image, to another location in its DRAM memory and thence to its associated frame buffer 155-1. Thus, the original version of an image and its spatially reduced version are stored in the DRAM memory associated with graphic system processor 150-1.

When all of the spatially reduced copies of the series of images have been displayed, as shown in FIG. 2, the user may then mark individual ones of the displayed images and cause them to be displayed in full spatial resolution, as mentioned above. The user does this by moving screen cursor 200 in conventional fashion to a selected image and marking it by operating a predetermined button on control panel 145, the button being designated, for example, "MARK" image. Control panel 145 responsive thereto outputs to bus 146-1 digital signals indicative of a code associated with the MARK image button. It is seen from FIG. 1 that bus 146-1 is "daisy chained" through the graphic system processors via busses 146-2, 146-3 and so on. However, since screen cursor 200 is positioned on display 160-1, i.e., on image I11, only graphic system processor 150-1 responds to the code of the MARK image button. Graphic system processor 150-1 does so by passing to central processor 100 via bus 105 a message identifying the marked image. Central processor 100, in turn, notes the identity of the marked image in memory 110. In particular, central processor 100 creates in memory 110 a so-called linked list pointing to the identities of the images that the user has marked for display in full spatial resolution, as will be discussed below in detail. Following the linking of the identity, central processor 100 sends to graphic system processor 150-1 a message directing the latter to mark the identified image on display 160-1. Graphic system processor 150-1 does this by highlighting, for example, the upper left-hand and lower right-hand corners of image I11, as shown in FIG. 2.

It is seen from FIG. 2, that the user has also marked ten other ones of the displayed images. Namely, the images designated I2, I5, I11, I21, I28 through I32, I45 and I69. Following the marking of the desired images, the user may then enter a request to redisplay the marked images in full spatial resolution. The user enters such a request by operating another predetermined button on control panel 145, the button being designated, for example, "VIEW" images. When the user does so, control panel 145 outputs to bus 146-1 digital signals indicative of a code representing the VIEW button. Graphic system processor 150-1 responsive to receipt of the code passes it to central processor 100.

In an illustrative embodiment of the invention, images that have been marked for full spatial resolution are reformed into groups of images with each group comprising illustratively four images. The forming of a group of images at this juncture is based on the numerical order of the identities of the marked images. It is thus possible that a group may contain less than four marked images or none at all, as is the case with the aforementioned marked images. For example, images I2, I5, I11 and I21 form the first group of marked images; images I28 through I31 form the second group of images; and images I32, I45 and I69 form the third group of images. Clearly, if the user had marked 16 images, then four groups of four images each group would be formed, the groups being displayed on respective ones of the display units 160-1 through 160-4.

Figure 4:
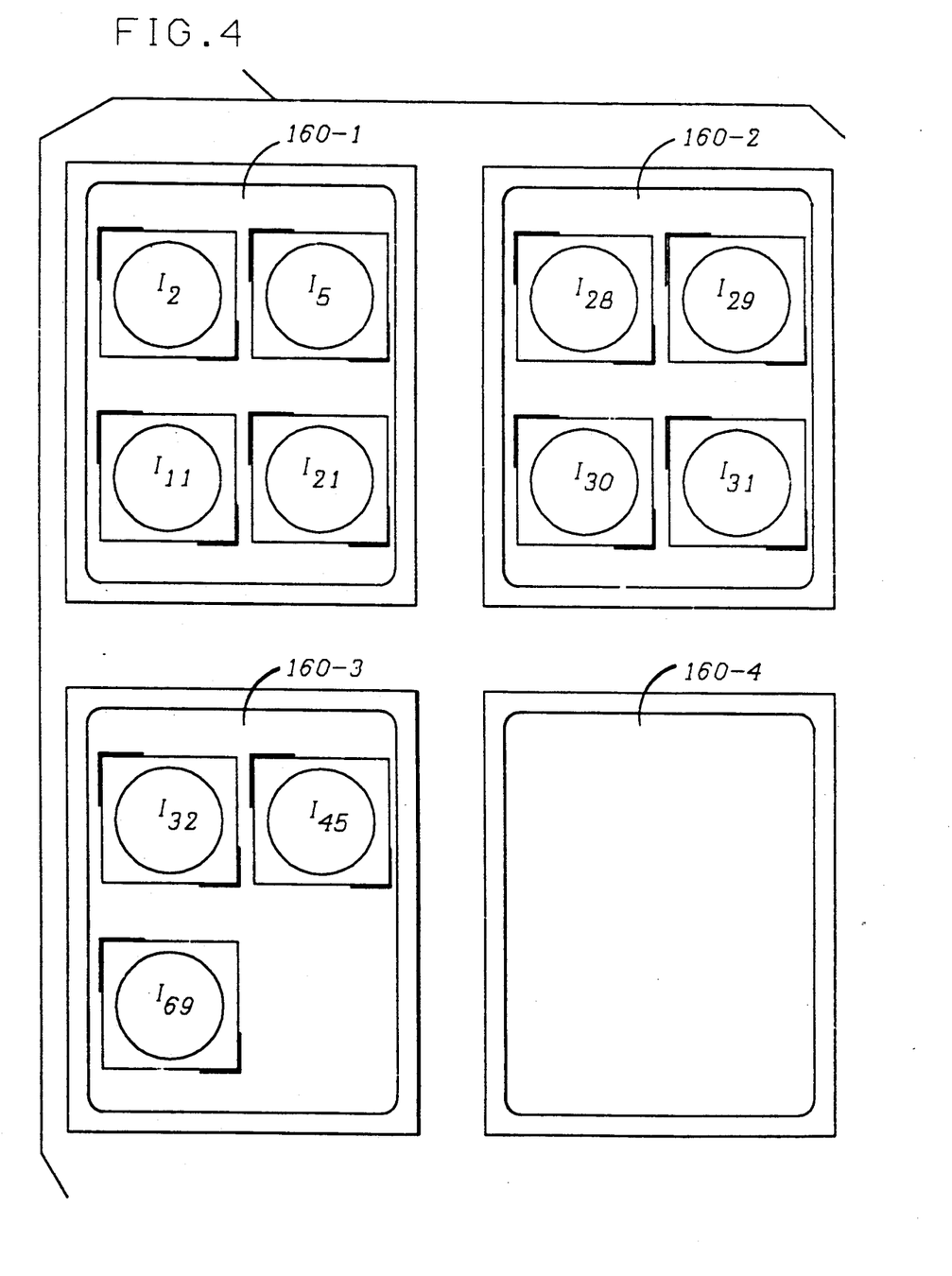
FIG. 4 illustrates the manner in which marked images are displayed across the display units of FIG. 1.

In particular, responsive to receipt of the code of the VIEW button, central processor 100 directs each of the graphic system processors 150-1 through 15-4 to erase the contents of their respective frame buffers 155-1 through 155-4, which causes the images to be erased from associated display units 160-1 through 160-4. It is noted that the reduced versions of those images are retained in the respective DRAM memories of graphic system processors 150-1 through 150-4, as mentioned above. The reason for retaining the reduced versions of the images will be made apparent below. Following the above task, central processor 100 then searches the aforementioned linked list to obtain the identities of the marked images. When central processor 100 has identified a marked image, it causes the full spatial version of the image, i.e. the original image, to be displayed on a respective one of the display units 160-1 through 160-4, as shown in FIG. 4. (The manner in which central processor is programmed to cause marked images to be displayed will be discussed below in detail)

It is seen from FIG. 4, that the displaying of the marked images are "left adjusted" so that, for example, the first group of marked images comprising images I2, I5, I11 and I21 are displayed on display unit 160-1. Similarly, the second and third groups of marked images are displayed on display unit 160-2 and 160-3, respectively. However, in the latter instance the third group comprises just three images, rather than four images, since the user had marked only eleven images, as assumed above.

Figure 5:
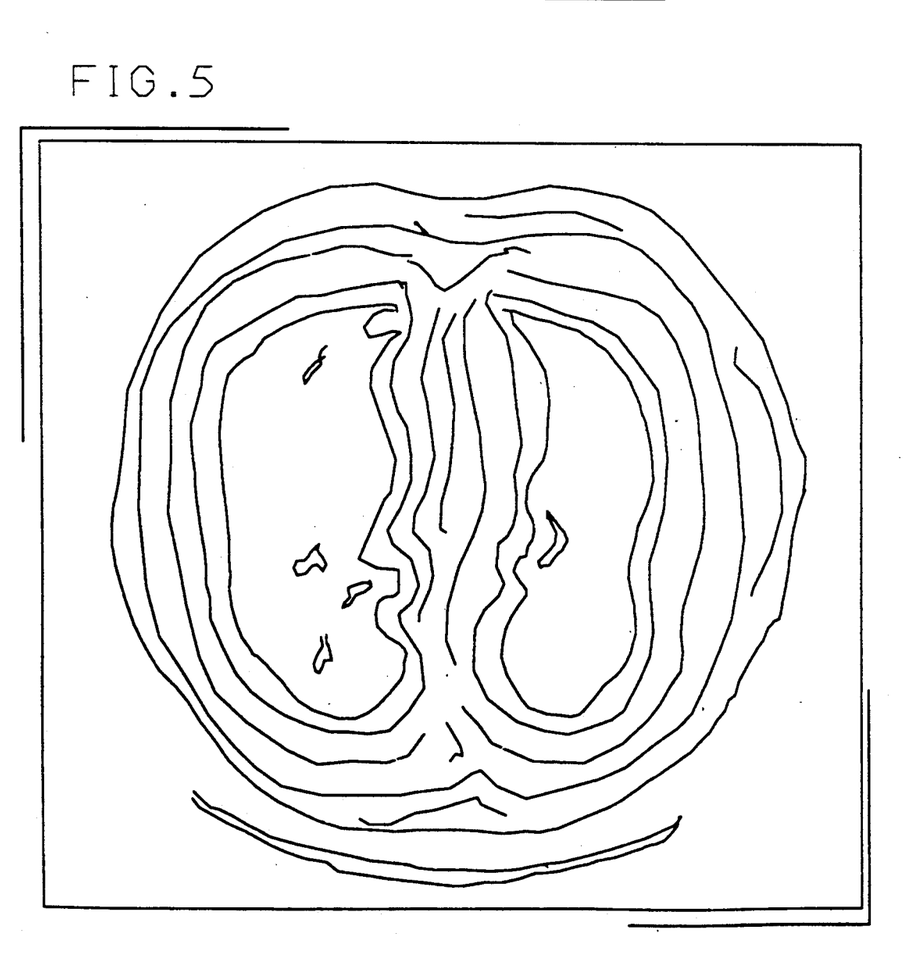
FIG. 5 is a rendition of one of the marked images depicted in FIG. 4.

It is also seen from FIG. 4 that, for drawing simplicity, circles are used to represent respective marked images displayed in full spatial resolution. However, for the sake of completeness a somewhat realistic rendition of the way marked image I2 would be displayed in full spatial resolution is depicted in FIG. 5. Nonetheless, what is important is a comparison between the way images are displayed in reduced spatial resolution, as shown in FIG. 2 (alternatively image I2 depicted in FIG. 3), and the way marked images are displayed in full spatial resolution, as shown in FIG. 4 (alternatively image I2 depicted in FIG. 5).

As an aspect of the invention, the user may redisplay the spatially reduced versions of the series of images by operating another predetermined button on control panel 145, the button being designated in this instance as, for example, the "LOW RES" button. When the user does so, control panel 145 sends to graphic system processor 150-1 via bus 146-1 digital signals indicative of a code assigned to the "LOW RES" button. Graphic system processor 150-1, in turn, passes the code to central processor 100 via bus 105. Responsive to receipt thereof, central processor 100 directs graphic system processors 150-1 through 150-4, one at a time, to redisplay the spatially reduced versions of the images stored in their respective DRAM memories. When graphic system processors 150-1 through 150-4 do so, the spatially reduced versions are redisplayed on display units 160-1 through 160-4, as shown in FIG. 2.

Figure 6:
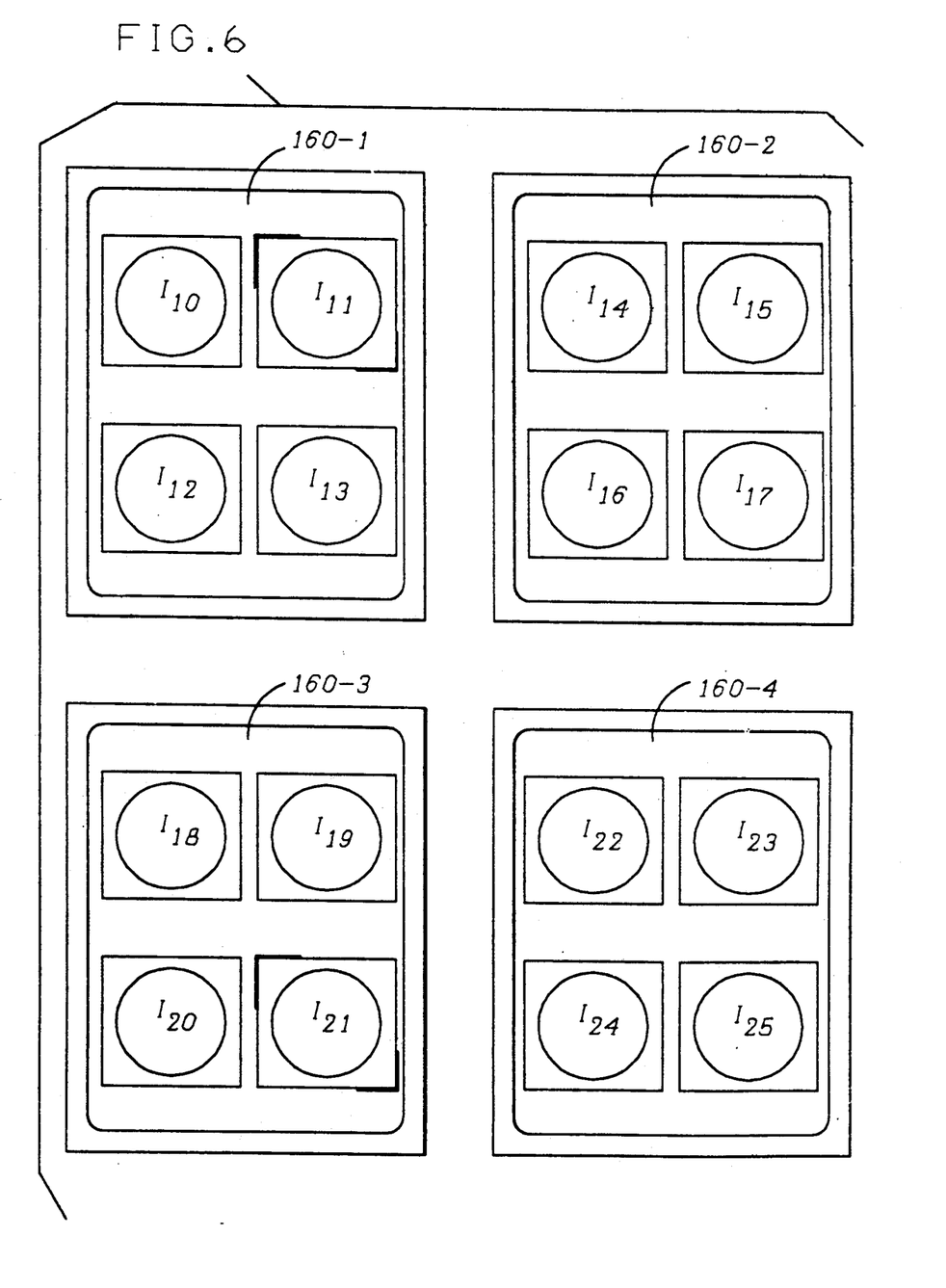
FIG. 6 illustrates the manner in which a selected image and a number of succeeding images are displayed across the display units of FIG. 1.

When the spatially reduced versions of the images are redisplayed, the user may mark other ones thereof and have them displayed in full resolution, in the manner discussed above. Alternatively, the user may, in accordance with an aspect of the invention, select just one of the images and enter a request to have that image and a predetermined number of succeeding images—illustratively fifteen—displayed in full spatial resolution. The user enters such a request by operating, for example, the "FULL RES" image button on control panel 145. Specifically, central processor 100 responsive to receipt of the digital code identifying the FULL RES button creates a list of images beginning with the identity of the image that screen cursor 200 is positioned on. Central processor 100 then enters in the list the identities of the next succeeding fifteen images. For example, if cursor 200 happens to be positioned on image I10, then the list contains the identity of that image followed by the identities of the next fifteen images, i.e., images I11 through I25. In addition, for each entry in the list, central processor 100 includes the identity of the displayed unit on which the image is to be displayed. Armed with this list, central processor 100 causes the sixteen images to be displayed in full spatial resolution across display units 160-1 through 160-4, as shown in FIG. 6. Thus, each of the display units 160-1 through 160-04 displays four images, with the first unit displaying images I10 through I13, the second unit displaying images I14 through I17, and so on.

Figure 7:
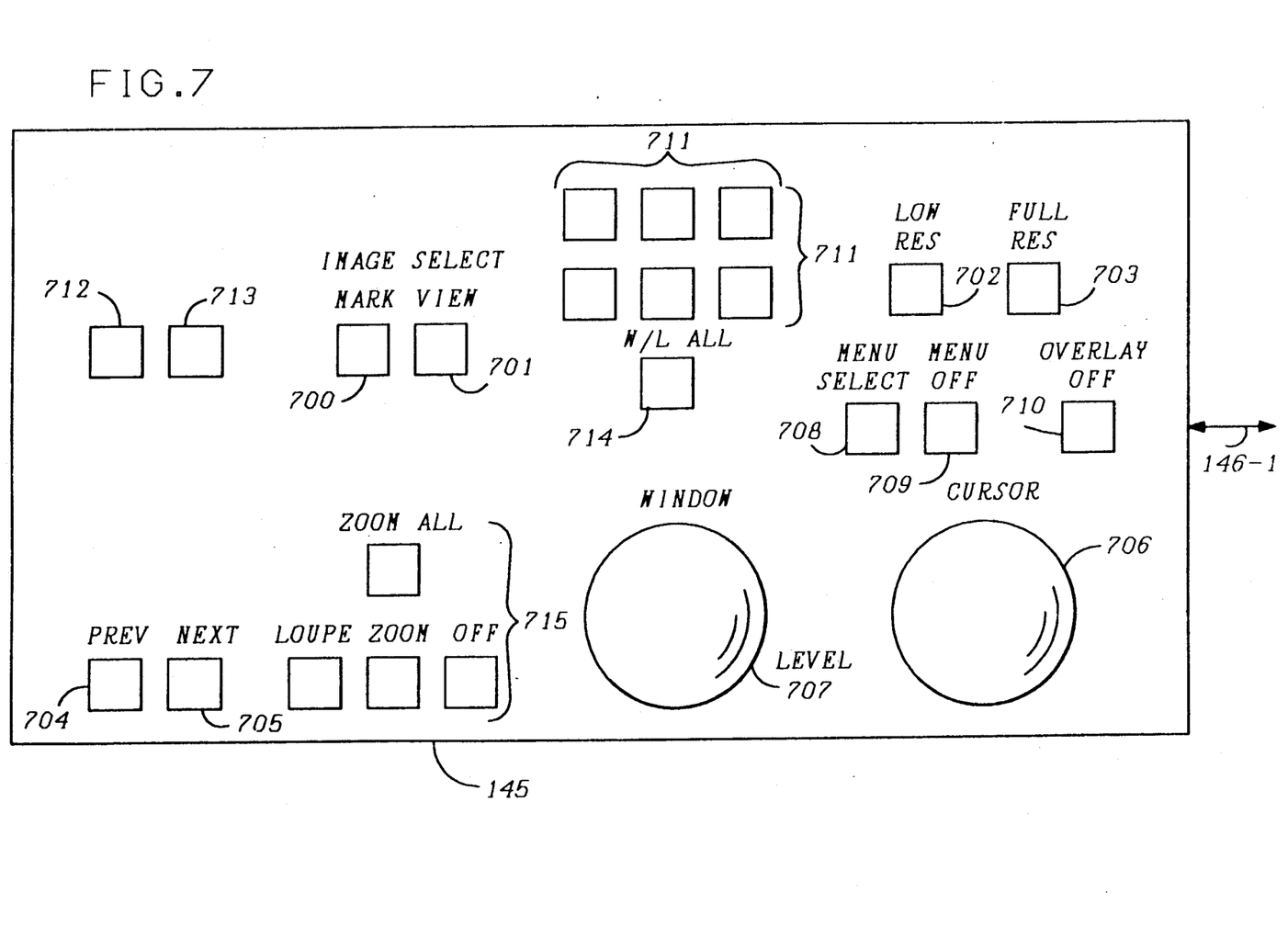
FIG. 7 illustrates a layout of a control panel shown in FIG. 1.

Turning now to FIG. 7, there is shown a block diagram of control panel 145. Control panel 145, which may be, for example, the model SA-65315 control panel available from Penny & Giles Potentiometers Ltd., Somerset Road, Christchurch, Dorset, United Kingdom, incorporates a microprocessor controlled interface which controls the operation of control panel 145. The interface is set at the factory to operate in the well-known Microsoft format. The transmission of data, e.g., a button code, via bus 146-1 may be either as an RS232 or TT1 serial data stream.

As seen from FIG. 7, control panel 145 includes various buttons and so-called track balls 706 and 707 for respectively controlling the movement of the screen cursor 200 and the setting of the window level of an image displayed on one of the display units 160-1 through 160-4. The function performed by each of the buttons designated 700 through 703 has been previously discussed. Of the remaining buttons, only the buttons designated "PREV" (previously) 704 and "NEXT" 705 are used in the practice of the invention.

Specifically, the NEXT button is used in the instance where, for example, a series contains more than 80 images. For example, assume that the series contains 100 images and system 10 responsive to a request inputted by the user has displayed the first 80 of those images, in the manner described above. If the user then desires to view the remaining 20 images of the series, i.e., images 81 through 100, he or she may do so by operating the NEXT button 705. Processor 100 responsive thereto displays those images and other ones of the series, in the manner discussed below. If, thereafter, the user desires to redisplay images 1 through 80 then he/she may do so by operating the PREV button 704. Processor 100 responsive to receipt of the code of the PREV button 704 redisplays images 1 through 80, in the manner discussed below.

The functions performed by each of the remaining buttons of control panel 145 are not relevant to the present invention and will not be discussed herein. However, it suffices to say that button 708 causes a menu of items to be displayed on the display unit on which cursor 200 is displayed. The menu of items allow the user to rotate an image about its Y-axis in 90 degree increments. Button 709 allows the user erase the menu of items. Button 710 allows the user to display and erase a so-called overlay. The overlay displaying, for example, the image number (identity), orientation and window level of a respective displayed image. The buttons collectively designated 711 are used to change the window level of a displayed image to a preestablished value when the displayed image depicts a particular type of human tissue, such as lung or heart tissue. Control panel 145 also includes a plurality of spare buttons reserved for future use, such buttons are collectively represented by buttons 712 and 713. Button 714, on the other hand, is used to change the window level of the images displayed on a display unit to the window level of the image on which screen cursor 200 is positioned. Whereas, the buttons collectively designated 715 are used to magnify a portion of a displayed image. For example, system 10 responsive to the user operating the "LOUPE, button. displays a so-called loupe (circle). The user controls the movement of the displayed loupe using cursor control 706. The user may then magnify that portion of an image covered by the displayed LOUPE by operating the "ZOOM" button. The user may thereafter magnify respective portions of the remaining display images of the group by operating the "ZOOM ALL" button. The user may thereafter restore the images to the way they were originally displayed by operating the "OFF" button.

We turn now to a discussion of the software program which implements the present embodiment of the invention in central processor 100.

Figure 8:
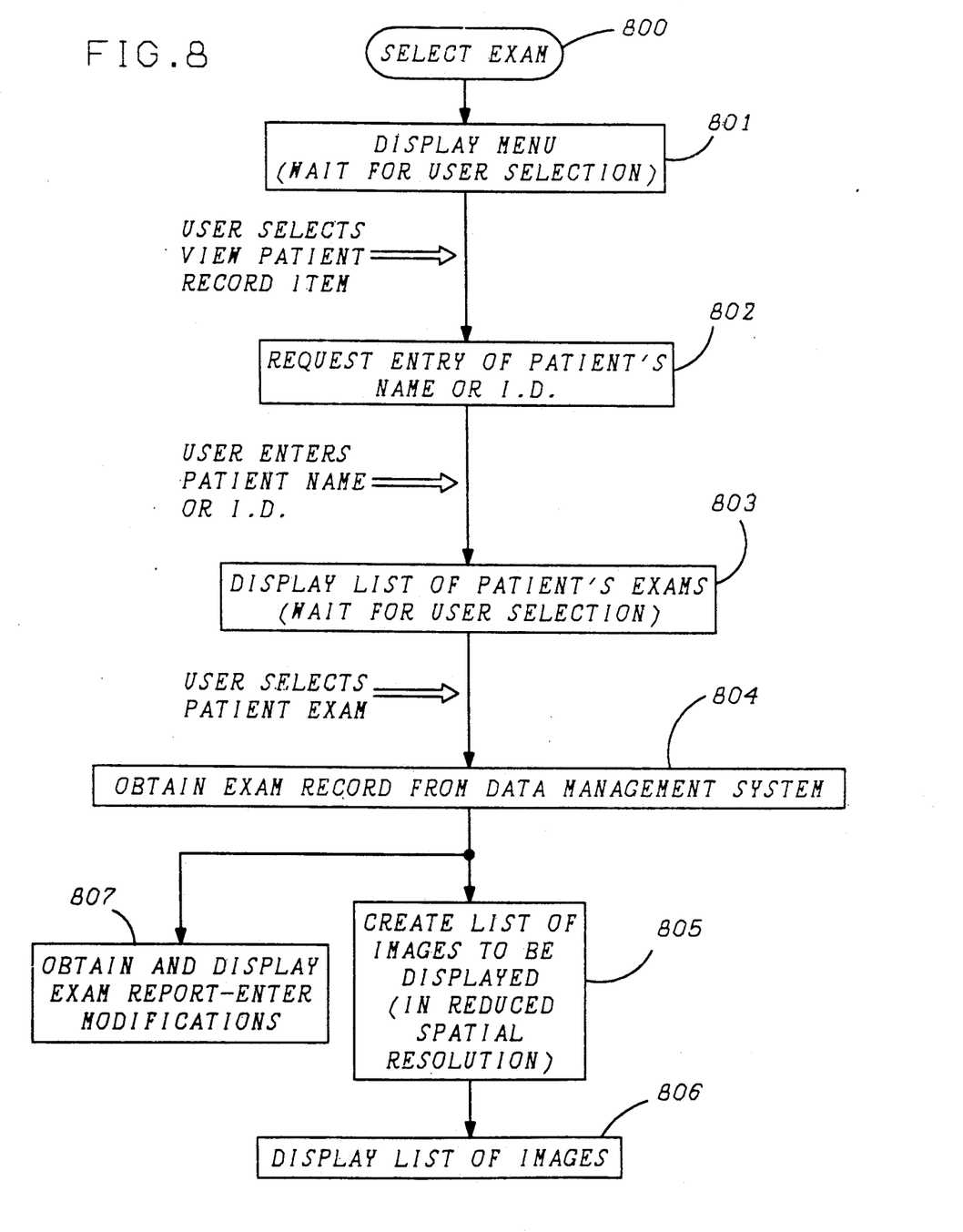
FIGS. 8-14 are flow charts of the program which controls the operation of the central processor of FIG. 1 in accordance with the principles of the invention.

In particular, and referring to FIG. 8, there is shown the program which is invoked after power has been applied to central processor 100 and its operating system has been booted up. The program upon entering block 800 proceeds to block 801 where it displays on terminal 165 a main menu of items, one of the items being identified as "VIEW PATIENT", the object of the present invention. The program then waits for the user to select one of the items listed in the menu. The program proceeds to block 802 when the user selects the "VIEW PATIENT" menu item. At block 802, the program displays a screen requesting the user to enter either the patient's name or identification number (I.D.). The program proceeds to block 803 when the user does so.

At block 803, the program passes the patient's identity to DMS 135 to obtain a list of the patient's examinations. The program displays the list on terminal 165 and then proceeds to block 804 when the user selects one of the displayed examinations. At block 804, the program passes the selected examination number to DMS 135 to obtain the associated examination record. The examination record includes a number of data fields and various remarks pertaining to the patient's examination. The data fields include, for example, the (a) type of scanner (CT, MRI, etc.) used to obtain the series of images, (b) number identifying the series of images, and (c) number of images in the series. (It is noted that each image in a series of images is identified by the order in which they were created (scanned) by scanner 170. Thus, the first image scanned is identified by, for example, the number one, the second image scanned is identified by the number 2, and so on.) At this point, the program splits into parallel processes running at blocks 805 and 807.

Specifically, at block 807, the program displays the aforementioned record on terminal 165 and enters in the remarks section of the record any additions or deletions (modifications) that the user makes thereto using the keyboard (not shown in the FIGS.) of terminal 165. Whereas, the program at block 805, armed with the examination record, creates a list of the images that are to be displayed in reduced spatial resolution on display units 160-1 through 160-4, the list being stored in memory 110. A line in the list contains the identity of the image to be displayed, and identity of the display unit on which the image is to be displayed on. Thus, the program creates a list comprising, for example, 80 lines, or entries, when the series contains 80 images. In this instance, the first 20 lines in the list would identify images one through twenty, respectively, and display unit 160-1. The next twenty lines in the list would identify images twenty-one through forty and display unit 160-2, respectively, and so on.

In addition, the program sets a so-called LOW RES/-FULL RES flag stored at a predetermined location in memory 110 to note that spatially reduced versions of the images are being displayed. The program then stores the list of images it has created in memory 110 and then proceeds to block 806. Block 806 is representative of a subroutine which processes a list of images to be displayed, in which the list may be created at one of a number of different points in the program, as discussed below. An expanded version of block 806 is shown in FIG. 9.

Figure 9:
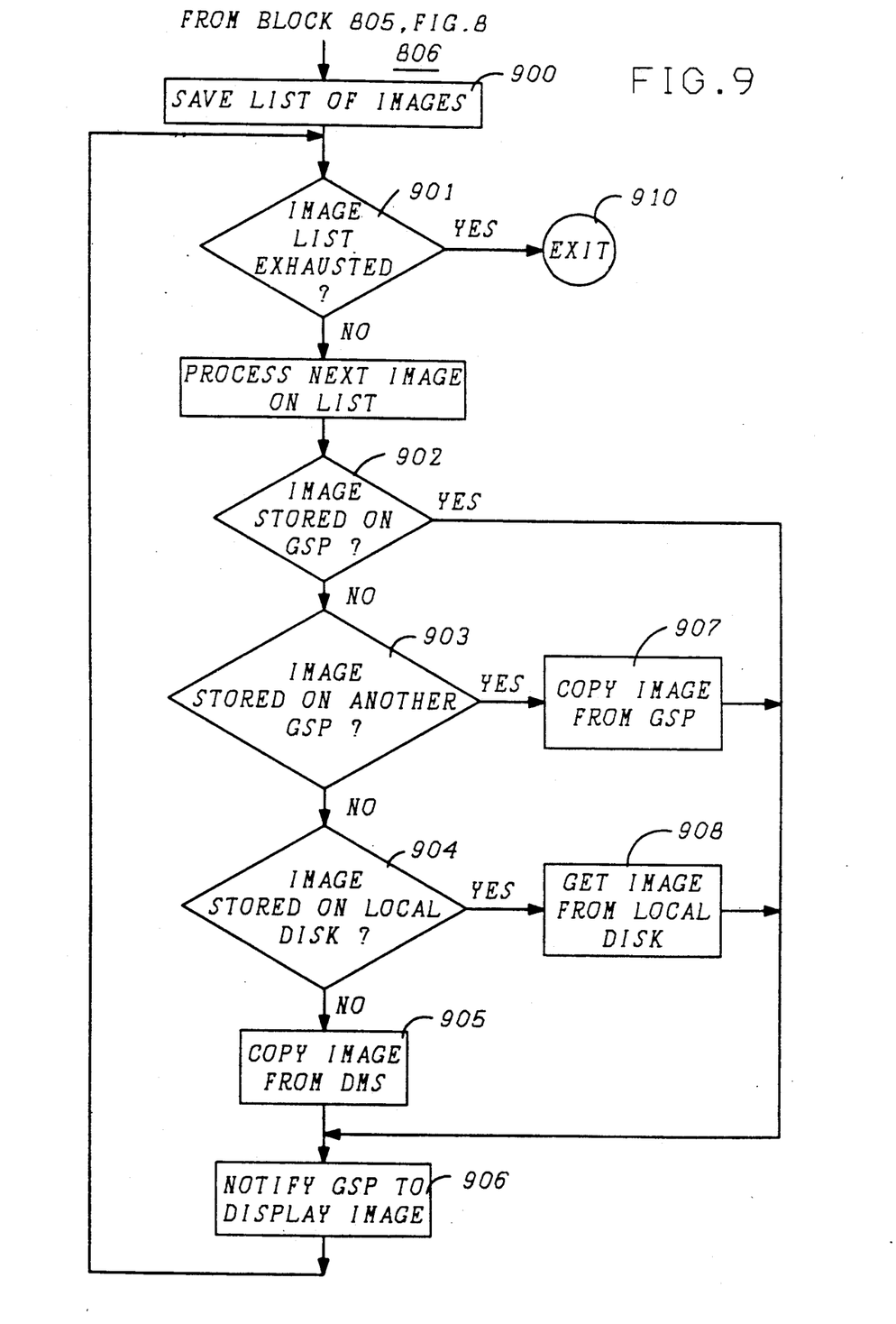

Turning then to FIG. 9, the program entering block 806 proceeds to block 900 where it saves the list of images in memory 110 and then proceeds to decision block 901 where it determines whether or not it has completed its task, i.e., has finished processing the last entry in the list. The program exits via block 910 if it finds that to be the case. Otherwise, it unloads the next line entry from the list and proceeds to block 902. At block 902, the program determines whether the image identified in the line entry has already been stored in the DRAM memory of the graphic system processor that is also identified in that entry. The program makes this determination by consulting another list identifying the images that are stored in the DRAM memories of graphic system processors 150-1 through 150-4. The program proceeds to block 906 if it finds that to be the case. Otherwise, it proceeds to block 903.

At block 903, the program determines if the image identified in the entry is stored in the memory of one of the other graphic system processors. The program makes this determination by also consulting the aforementioned other list, and proceeds to block 907 if it finds that to be the case. Otherwise, it proceeds to block 904.

At block 907, the program directs the graphic system processor having the image stored in its DRAM memory to download the image to bus 105. The program then proceeds to block 906.

At block 904, the program determines if the image is stored in local disk 115. The program makes this determination by consulting a list containing the identities of the images that are stored in local disk 115. The program proceeds to block 908 if it finds that to be the case. Otherwise, it proceeds to block 905. At block 908, the program directs local disk 115 to download to bus 105 the image identified in the entry being processed. The program then proceeds to block 906.

At block 905, the program directs data management system (DMS) 140 to download to bus 105 the image identified in the entry being processed. The program then proceeds to block 906. At block 906, the program forms a command containing the identity of the image identified in the entry being processed and sends the command to the graphic system processor that is also identified in that entry. The command also directs the graphic system processor to display the image in either full resolution or spatially reduced resolution and indicates whether the image is stored in the DRAM memory of the graphic system processor or is being downloaded to bus 105. In the latter case, the image is removed from the bus 105 buffer and stored in the associated DRAM memory, in the manner discussed above. The program then proceeds to block 901 to process the next line entry in the aforementioned list of images to be displayed.

Figure 10:
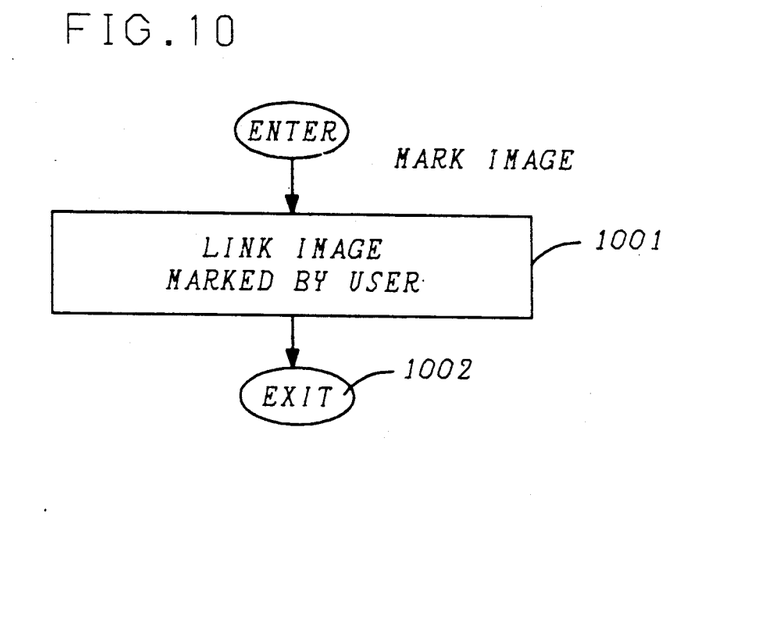

As mentioned above, each graphic system processor is arranged to notify central processor 100 whenever an image displayed on its associated display unit has been marked by the user. Central processor 100, in turn, invokes the program depicted in FIG. 10 to process the notification. The program when entered proceeds to block 1001, where it operates to establish a so-called linked list of the images marked by the user. The program does this by entering in the display list created at block 805 at the line reserved for the latest image marked by the user the identity of the priorly marked image which numerically precedes the identity of the latest marked image. The program also inserts in that line the identity of the priorly marked image which numerically succeeds the identity of the latest marked image, if any. Thus, except for the first and last images in the linked list, the line entry of each marked image points to the preceding and succeeding marked images, respectively. In this way, the marked images are linked to one another in numerical order, rather than in the order in which they were marked by the user. The program is also designed to store in a predetermined memory 110 location a pointer which points to the first marked image in the linked-list. The reason for storing this latter pointer will be made apparent below.

Figure 11:
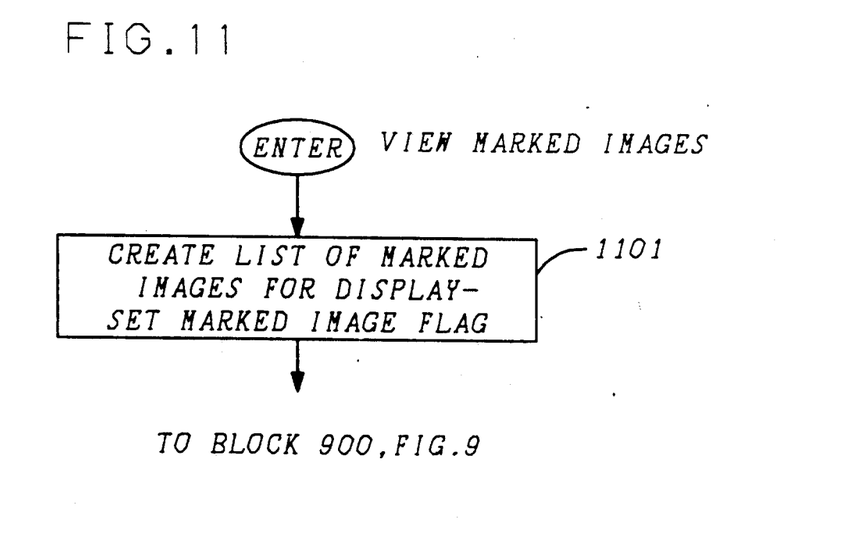

Turning now to FIG. 11, there is shown a flow chart of the subroutine which central processor 100 enters responsive to the operation of the VIEW image button. In particular, the subroutine upon being invoked proceeds to block 1101 where it constructs a list of the marked images from the linked list created at block 1001. The program does this by locating the first marked image in the linked-list using the contents of the aforementioned memory 110 pointer. The program then identifies the next, or second, marked image in the linked-list using the pointer contained in the line entry associated with first marked image. The program similarly identifies the remaining marked images by wending its way through the linked-list and adding to the display list that is being established the identity of each such marked image. As was done at block 805, the subroutine includes for each marked image contained in the display list the identity of the display unit on which the marked image is to be displayed in full spatial resolution. In addition, the program clears the LOW RES/FULL RES flag and sets a so-called "marked image" flag stored at a predetermined location in memory 110. The program then transfers to block 900 of FIG. 9 to process the list, in the manner discussed above.

As mentioned above, the user has the option of causing the spatially reduced versions of the images to be redisplayed in full spatially resolution or vice-versa by operating either the LOW RES button or FULL RES button on control panel 145, respectively. Central processor 100 responsive to the user operating either one of those buttons enters the subroutine depicted in FIG. 12.

Figure 12:
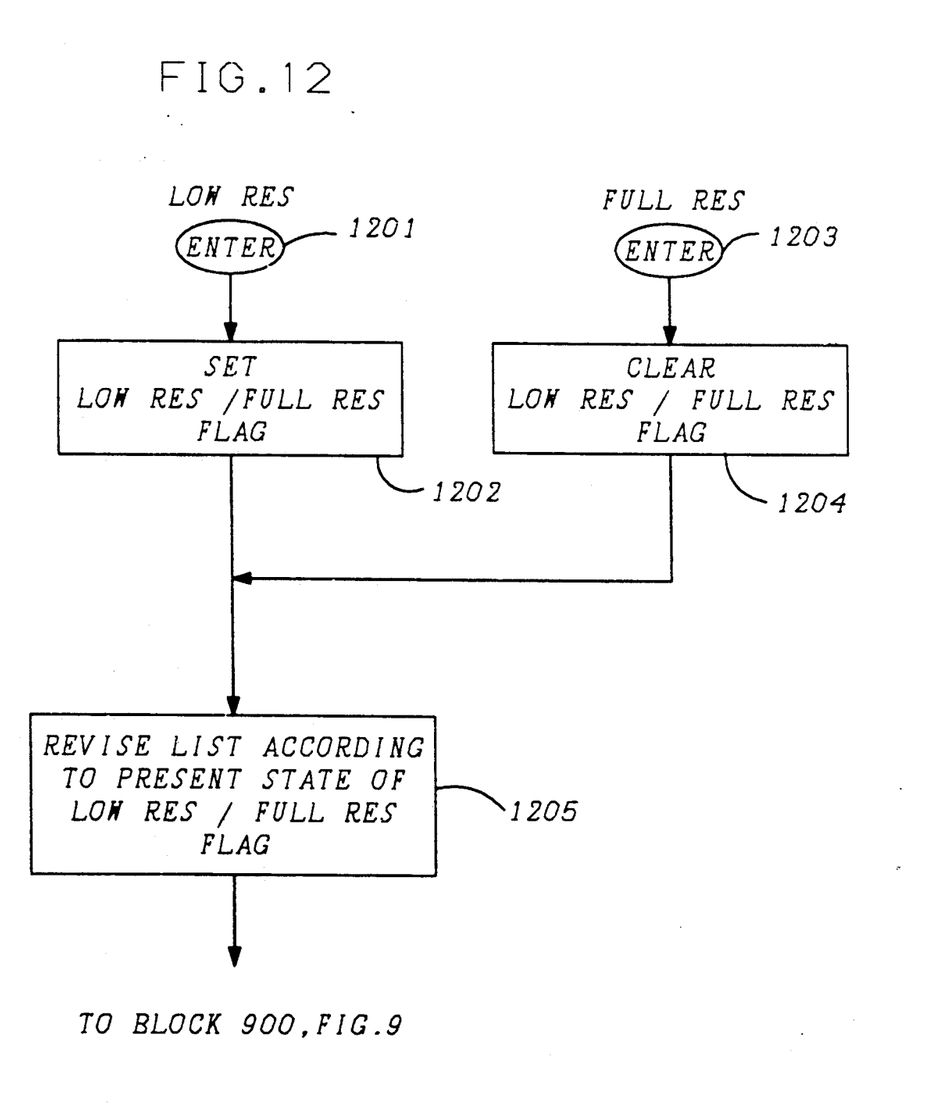

In particular, the subroutine is entered at block 1201 if the user has operated the LOW RES button and is entered at block 1203 if the user has operated the FULL RES button. The subroutine entered at block 1201 proceeds to block 1202 where it sets the LOW RES/FULL RES flag and then proceeds to block 1205. The subroutine entered at block 1203, on the other hand, proceeds to block 1204 where it clears the LOW RES/FULL RES flag. The subroutine then proceeds to block 1205.

At block 1205, the program creates a display list in accordance with the current state of the LOW RES/FULL RES flag. That is, if the LOW RES/FULL RES flag is set, then the program creates a display list similar to the way it created the list at block 805. If, on the other hand, the aforementioned flag is clear, then the program creates a display list beginning with the identity of the image at which the screen cursor 200 is currently positioned. The program then inserts in the display list the identities of the next fifteen succeeding images. The program then proceeds to block 900 of FIG. 9 to carry out the user's request.

As mentioned above, scanner 170 may be set to scan a series containing more than 80 images. In that instance, the first eighty images of the series are displayed across display units 160-1 through 160-4 in the manner discussed above. Thereafter, the user may cause the remaining images to be displayed by operating the NEXT page button of control panel 145. Central processor responsive thereto invokes the subroutine shown in FIG. 13 to process the request.

Figure 13:
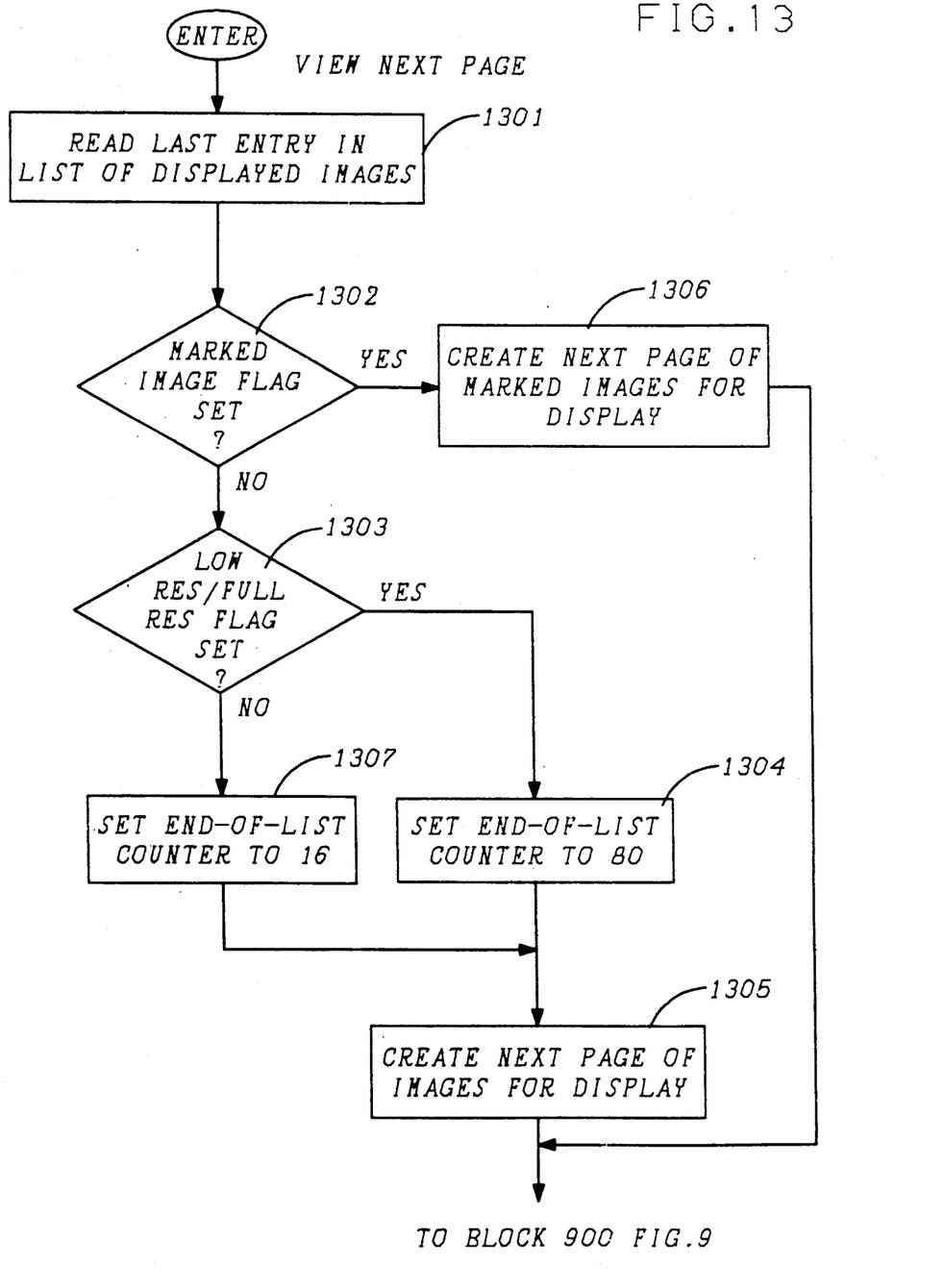

Specifically, when the subroutine, or program, is invoked it proceeds to block 1301 where it reads the last entry in the list of displayed images and then proceeds to block 1302. At block 1302, the program checks the state of the marked-image flag and proceeds to block 1306 if the flag is set. Otherwise, the program proceeds to block 1303. At block 1303, the program checks the state of the LOW RES/FULL RES flag to determine whether spatially reduced versions of the images are currently being displayed. The program proceeds to block 1304 if finds that to be the case. Otherwise, the program proceeds to block 1307.

At block 1304 the program stores the value 80 in a so-called end-of-list counter, the value 80 being indicative of the number of images that are to be displayed across display units 160-1 through 160-4. Whereas, at block 1307, the program stores the value 16 in the end-of-list counter and then proceeds to block 1305.

At block 1305, the program creates a list containing the next page of images that are to be displayed across display units 160-1 through 160-4. The program does this by decrementing the end-of-list counter and entering as the first item in the list the identity of the image which serially follows the image identified as being the last entry in the list of displayed images read at block 1301. The program then enters in the list the identity of the next image and decrements the contents of the end-of-list counter. The program then checks the contents of that counter to determine if it has completed its task. That is, if the value of the contents of the counter is greater than zero, then the program continues to construct the list of images to be displayed. Otherwise, the program proceeds to block 900 of FIG. 9 to process the list of images, in the manner discussed above.

It is noted that the program employs a so-called "wrap around" mode if the next page of images does not contain a sufficient number images to "fill up" the screens of display units 160-1 through 160-4. For example, if the series contains 100 images, then only 20 of those images (images 81 through 100) would comprise the next page of images, assuming that spatially reduced versions of the images are displayed across display units 160-1 through 160-4. Therefore, to "fill up" the screens of the display units, the list of images created at block 1305 would contain the identities of images 81 through 100 followed by the identities of images 1 through 60. Accordingly, images 81 through 100 would be displayed on display unit 160-1, images 1 through 20 would be displayed on display unit 160-2, and so on.

At block 1306, the program creates the list containing the next page of marked images to be displayed and then transfers to block 900 of FIG. 9 to process the list in the manner described above. The program creates the next page of marked images by reading the contents of the line in the display list created at block 805 that is associated with the identity of the image contained in the entry obtained at block 1301. The program does this to determine the identity of the next marked image in the linked list. When the program makes that identification, it then proceeds in the manner described above to create the next page of marked images by identifying the succeeding marked images in the linked list.

As mentioned above, the user may operate the PREVIOUS button on control panel 145 to replace the images that are currently displayed across display units 160-1 through 160-4 with a previous page of displayed images. When the user operates that button, central processor 100 invokes the program illustrated in FIG. 14.

Figure 14:
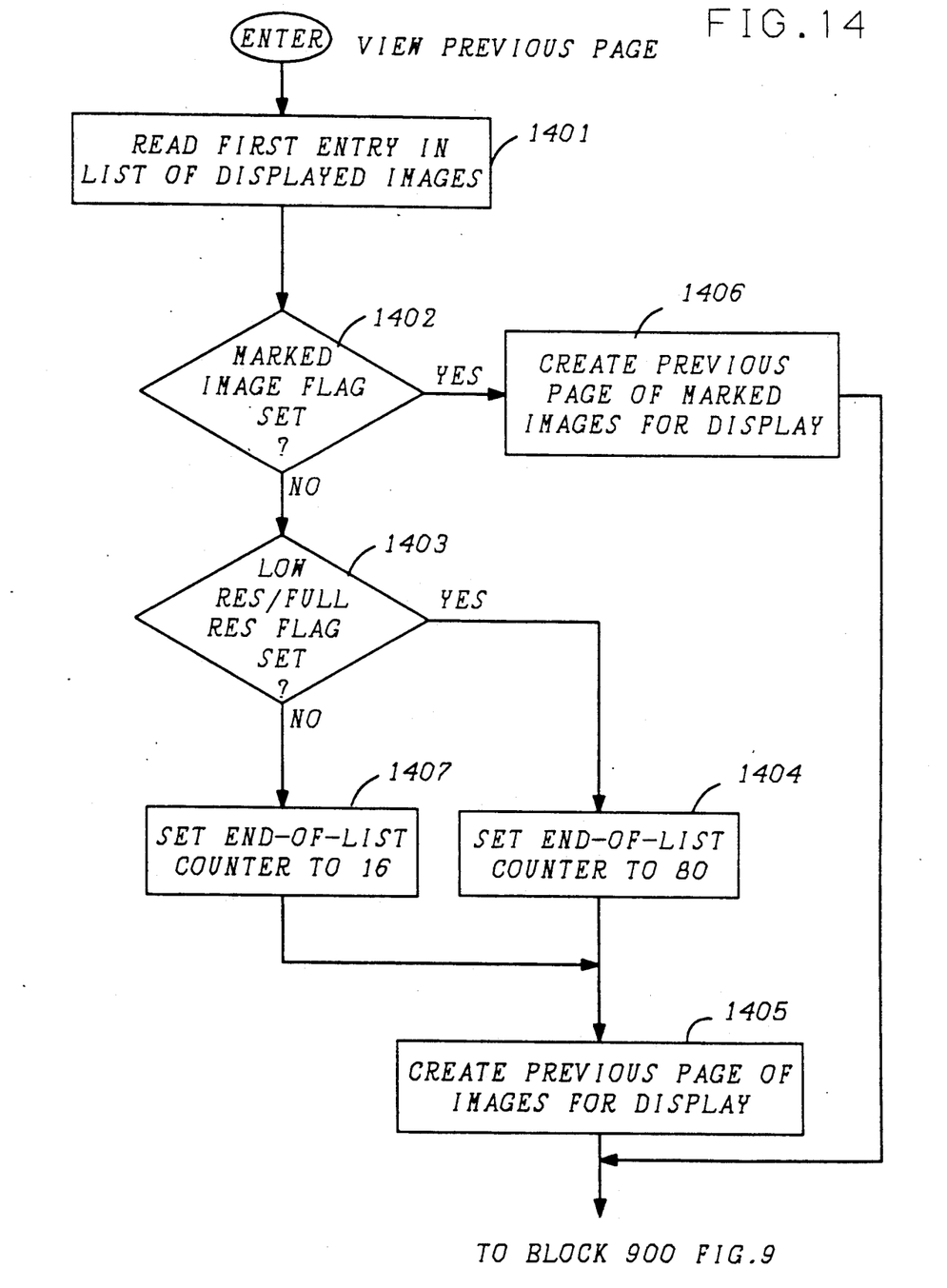

Specifically, when the program is invoked it proceeds to block 1401 where it reads the first entry in the list of displayed images. The program then proceeds to block 1402 where it checks the state of the marked image flag. If that flag is set, then the program proceeds to block 1406. Otherwise, it proceeds to block 1403. At block 1403, the program checks the state of the LOW RES/FULL RES flag and proceeds to block 1404 if it finds that that flag is set. Otherwise, the program proceeds to block 1407.

Like blocks 1304 and 1307 of FIG. 13, the program at blocks 1404 and 1407 loads either the value 80 or 16, respectively, into the aforementioned end-of-list counter and then proceeds to block 1405. At block 1405, the program creates the list of images previously displayed across display units 160-1 through 160-4. As before, the program does this by decrementing the end-of-list counter and entering as the last item in the list the identity of the image which serially precedes the image identified in the entry read at block 1401. The program then enters as the next to last entry in the list the identity of the next preceding image. The program then decrements the end-of-list counter and then checks the contents thereof to determine if it has completed its task. That is, the program continues to create the previous page of images in the manner described if it finds that the value of the contents of the counter is greater than zero. Otherwise, the program proceeds to block 900 of FIG. 9 to process the previous page of images it has created. (It is understood of course, that in creating the list, the program notes therein the identity of the display unit on which the image is to be displayed, as discussed above.)

The program at block 1406 operates to create the list containing the previous page of marked images. Specifically, to obtain the identity of the previous marked image, the program interrogates the display list created at block 805 to obtain the entry associated with the marked image identified at block 1401. As noted above, the entries associated with the marked images are linked together such that the contents of an entry points to the previous marked image. Having thus identified the previous marked image, the program inserts its identity as the last entry in the list that the program is creating. The program again interrogates the display list created at block 805 using the identity of the previous marked image. The program does this in the manner discussed above to obtain the identity of the next preceding marked image. The program then inserts the identity of the next preceding marked image as the next to last entry in the list that it is creating. The program continues in this manner to create the list containing the previous page of marked images and then proceeds to block 900 of FIG. 9 to process the list, i.e., to display the images identified therein.

It is thus seen that the operation of the programs depicted in FIGS. 13 and 14 are somewhat similar to one another, since they perform similar, albeit opposite, functions.

The foregoing is merely illustrative of the principles of the invention. Those skilled in the art will be able to devise numerous arrangements which, although not explicitly shown or described herein, embody those principles and are within its scope and spirit. For example, control panel 145 buttons, such as VIEW, MARK, LOW RES, FULL RES, NEXT page, PREVIOUS page, etc., could be replaced by respective menu items displayed on terminal 165, which the user selects in conventional fashion. In addition, as mentioned above, the resolution or number of display units could be increased to display a series containing more than 80 images.

We claim:

1. An arrangement for displaying a series of images comprising at least one display unit, said display unit having a display whose resolution is insufficient for simultaneously displaying each of said series of images, means, responsive to a request entered by a user of said arrangement, for forming, in accordance with a predetermined reduction ratio, a spatially reduced copy of each of said series of images and for simultaneously displaying each such copy on said at least one display unit, and means thereafter responsive to another request entered by said user for simultaneously displaying on said display in full spatial resolution that one of said displayed series of images at which a screen cursor is positioned including a predetermined number of succeeding ones of said displayed series of images.

2. The arrangement set forth in claim 1 wherein each of said series of images is defined by respective picture elements, said arrangement further comprising a memory having a plurality of memory locations identified by respective rows and columns, said series of images being stored in respective blocks of said memory, and wherein each spatially reduced copy is formed from the picture elements stored in every other row and column beginning with a predetermined row and column of its respective block of said memory.

3. The arrangement set forth in claim 1 wherein said means for simultaneously displaying includes means responsive to still another request entered by said user for simultaneously displaying on said display in full spatial resolution individual ones of said displayed series of images that have been selected by said user in a predetermined manner.

4. The arrangement set forth in claim 1 further comprising means operative when all of said copies cannot be simultaneously displayed on said display for then displaying on said display a predetermined number of said copies, and thereafter operative responsive to a predetermined request entered by said user for displaying the remaining ones of said copies in place of said predetermined number of said copies.

5. The arrangement set forth in claim 4 further comprising means responsive to said user entering another predetermined request for redisplaying said predetermined number of said copies.

6. An arrangement for displaying a series of images, said arrangement comprising a plurality of terminals each having a display of a predetermined resolution, means operative for creating, in accordance with a predetermined reduction ratio, spatially reduced copies of respective ones of said series of images, for forming said copies into respective groups of copies based on the order in which they are created, and for displaying said groups on respective ones of said display terminals, and means, thereafter responsive to a request entered by a user of said arrangement, for forming into respective other groups of images that one of said displayed copies at which a displayed cursor is positioned including a predetermined number of succeeding ones of said displayed copies and for displaying said other groups in full spatial resolution on respective ones of said plurality of display terminals.

7. The arrangement set forth in claim 6 wherein each of said series of images is defined by respective picture elements, said arrangement further comprising a memory having a plurality of memory blocks each defined by a number of respective rows and columns of memory locations, said series of images being stored in respective ones of said blocks of memory, and wherein each of said spatially reduced copies is formed from picture elements stored in every other row and column beginning with a predetermined row and column of the respective one of said blocks.

8. The arrangement set forth in claim 6 further comprising means responsive to another request entered by said user for forming into respective groups of images individual ones of said displayed copies selected by said user in a predetermined manner and for displaying in full spatial resolution on respective ones of said display terminals said groups of selected copies.

* * * * *